(12) United States Patent
Deshmukh et al.

(10) Patent No.: US 11,669,684 B2
(45) Date of Patent: Jun. 6, 2023

(54) METHOD AND SYSTEM OF NATURAL LANGUAGE PROCESSING IN AN ENTERPRISE ENVIRONMENT

(71) Applicant: Paro AI, LLC, Orefield, PA (US)

(72) Inventors: Imran Deshmukh, Bethlehem, PA (US); Rob Tedesco, Fogelsville, PA (US)

(73) Assignee: Paro AI, LLC

( * ) Notice: Subject to any disclaimer, the term of this patent is extended or adjusted under 35 U.S.C. 154(b) by 51 days.

(21) Appl. No.: 17/014,216

(22) Filed: Sep. 8, 2020

(65) Prior Publication Data

US 2021/0073468 A1     Mar. 11, 2021

Related U.S. Application Data

(60) Provisional application No. 62/927,298, filed on Oct. 29, 2019, provisional application No. 62/896,186, filed on Sep. 5, 2019.

(51) Int. Cl.
| | |
|---|---|
| *G06F 40/279* | (2020.01) |
| *G06Q 10/10* | (2023.01) |
| *G10L 15/26* | (2006.01) |
| *G06N 20/00* | (2019.01) |
| *G06F 16/33* | (2019.01) |
| *G06Q 30/018* | (2023.01) |

(52) U.S. Cl.
CPC ........ *G06F 40/279* (2020.01); *G06F 16/3344* (2019.01); *G06N 20/00* (2019.01); *G06Q 10/10* (2013.01); *G06Q 30/0185* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,930,764 | A | 7/1999 | Melchione et al. |
| 6,757,362 | B1 | 6/2004 | Cooper et al. |
| 7,401,295 | B2 | 7/2008 | Aldrich et al. |
| 7,949,578 | B2 | 5/2011 | Johnson et al. |
| 7,974,870 | B2 | 7/2011 | Ikezawa |
| 8,597,031 | B2 | 12/2013 | Cohen et al. |
| 8,602,794 | B2 | 12/2013 | Cohen |
| 8,744,890 | B1 | 6/2014 | Bernier et al. |

(Continued)

OTHER PUBLICATIONS

International Search Report and Written Opinion issued in PCT/US20/46669 dated Dec. 17, 2020.

*Primary Examiner* — Nafiz E Hoque
(74) *Attorney, Agent, or Firm* — The Belles Group, P.C.

(57) ABSTRACT

A system, method, and/or device may receive a plurality of terms in a natural language of a user. The plurality of terms may relate to at least one domain of an enterprise of domains. The plurality of terms may be stored as text. For a (e.g., each) term of the plurality of terms, one or more domain levels may be determined in which the term is associated. The domain levels (e.g., each of the domain levels) may be associated with a specificity. From the domain levels, a most specific domain level having a highest degree of specificity may be identified. The term may be associated with a domain-specific term associated with the term at the most specific domain level. The domain-specific term associated with the term may be stored.

19 Claims, 8 Drawing Sheets

(56) References Cited

U.S. PATENT DOCUMENTS

| | | |
|---|---|---|
| 8,887,047 B2 | 11/2014 | Digiantomasso et al. |
| 8,943,094 B2 | 1/2015 | Brown et al. |
| 9,172,747 B2 | 10/2015 | Walters et al. |
| 9,202,227 B2 | 12/2015 | Kahlow |
| 9,823,811 B2 | 11/2017 | Brown et al. |
| 10,140,322 B2 | 11/2018 | Donneau-Golencer et al. |
| 10,282,419 B2 | 5/2019 | Hebert et al. |
| 2002/0087309 A1 | 7/2002 | Lee et al. |
| 2004/0002868 A1 | 1/2004 | Geppert et al. |
| 2008/0091633 A1* | 4/2008 | Rappaport ............. G06N 5/022 706/50 |
| 2011/0191681 A1 | 8/2011 | Stark |
| 2017/0091320 A1 | 3/2017 | Psota et al. |
| 2018/0046716 A1 | 2/2018 | Rappaport et al. |
| 2018/0212852 A1 | 7/2018 | Kumar et al. |
| 2018/0330011 A1 | 11/2018 | DeLuca et al. |
| 2018/0376002 A1 | 12/2018 | Abraham |
| 2019/0325873 A1 | 10/2019 | Mathias et al. |
| 2020/0251100 A1* | 8/2020 | Tan ....................... G06N 3/0454 |

\* cited by examiner

METHOD AND SYSTEM OF NATURAL LANGUAGE PROCESSING IN AN ENTERPRISE ENVIRONMENT

CROSS REFERENCE TO RELATED APPLICATIONS

The present application claims the benefit of U.S. Provisional Patent Application No. 62/896,186 filed on Sep. 5, 2019 and U.S. Provisional Patent Application No. 62/927,298 filed on Oct. 29, 2019, which are incorporated herein by reference.

BACKGROUND

Assistants may be used to provide guidance, information, and other types of support to another. By providing guidance and information to another, assistants may provide time to the supported person, allowing the supported person to focus on higher level work. While an assistant may be a live person, technology advancements have allowed many tasks typically performed by a human to be performed digitally. Convention digital assistants are typically generic assistants that can generally be used to assist in tasks. Because convention digital assistants are generally used, they suffer from the precision that is often critical to tasks directed to a unique domain. For example, a generic digital assistant may not provide accurate assistance with a salesperson in the healthcare field, as such fields relate to very specific terms, regulations, etc. that are not recognized by a generic digital assistant.

What is desired is a digital assistant that can perform accurate assessments of user queries, statements, etc. relating to one or more specific domains, such as a life sciences business. In order to provide the most accurate information relating to multiple domains, what is further desired is a natural language processing that can be used to provide and/or interpret a term used by a user that is appropriate for the desired domain of a possible multitude of domains.

BRIEF SUMMARY

The present disclosure may be directed, in one aspect, to a system, method, and/or device that receives a plurality of terms in a natural language of a user. The plurality of terms may relate to at least one domain of an enterprise of domains. The plurality of terms may be stored as text. For a (e.g., each) term of the plurality of terms, one or more domain levels may be determined in which the term is associated. The domain levels (e.g., each of the domain levels) may be associated with a specificity (e.g., a predetermined specificity). From the domain levels, a most specific domain level having a highest degree of specificity may be identified. The term may be associated with a domain-specific term associated with the term at the most specific domain level. One or more domain-specific terms associated with one or more terms may be stored.

In another aspect, a system, method, and/or device may receive user information via a user interface. The user information may be associated with a user. A query or a statement may be received from the user. The query or the statement may be associated with at least one of a function domain, a business domain, an organization domain, or a product domain. Based on one or more business rules, one or more portions of the query or the statement to be removed may be determined and one or more portions of the query or the statement to be retained may be determined. Information associated with the one or more portions of the query or the statement to be retained may be saved. The information retrieved from the database that is associated with the one or more portions of the question to be retained may be saved.

BRIEF DESCRIPTION OF THE DRAWINGS

The present disclosure will become more fully understood from the detailed description and the accompanying drawings, wherein.

DETAILED DESCRIPTION

Figure 1:
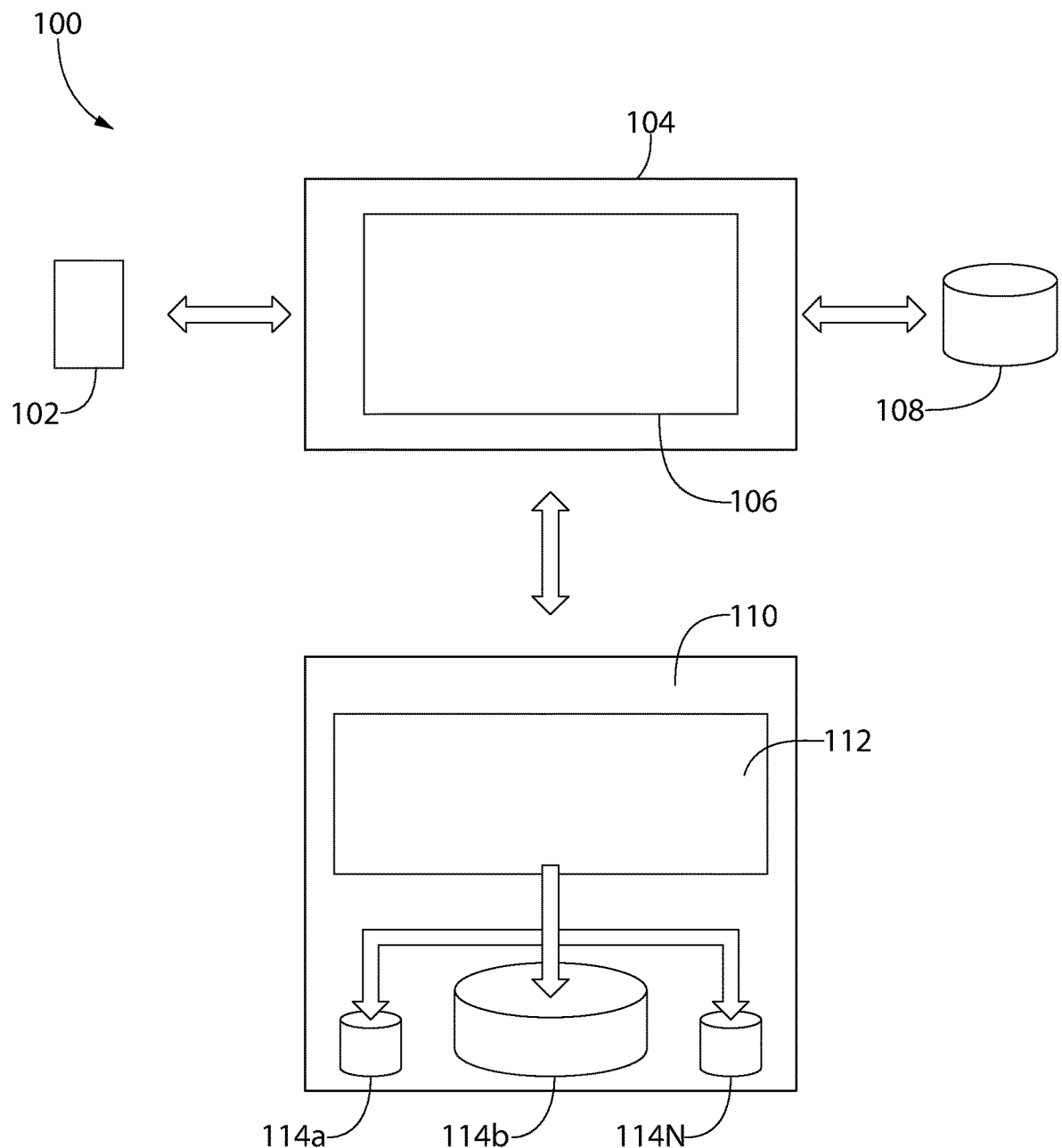
FIG. 1 is a high-level architectural overview of an example enterprise digital assistant (EDA).

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to an interpretation of "based entirely on."

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

A digital assistant may be used to provide guidance, information, and other types of support to another. Digital assistants may be generic assistants that can generally be used to assist in tasks and/or may be specific assistants that may be used for a specific task. As described herein, digital assistants may be used that relate to a single domain or a multitude of domains, such as an enterprise of domains. The domains may be associated with one or more areas of a company. For example, the domains may be associated with a function of a company, a business of a company, an organization (e.g., a company), a product, and the like.

A digital assistant used for a multitude of domains may be referred to as an enterprise digital assistant (EDA). Domains (e.g., domains of the enterprise) may include a multiple of domains, such as a function domain, a business domain, an organization domain, a product domain, and the like. The EDA may provide assistance that is specific (e.g., unique) to one or more (e.g., each) of the domains. For example, the enterprise digital assistant may provide guidance and/or information specific to a sales function that is different than the one or more other domains (such as one or more domains other than a function domain); the enterprise digital assistant may provide guidance and/or information specific to a life sciences business that is different than the one or more other domains (such as one or more domains other than a business domain); the enterprise digital assistant may provide guidance and/or information specific to an organization that is different than the one or more other domains (such as one or more domains other than an organization domain); the enterprise digital assistant may provide guidance and/or information specific to a product that is different than the one or more other domains (such as one or more domains other than a product domain), etc.

The domains may be formed in a hierarchy. For example, the domains may be formed in levels (e.g., domain levels) based on a specificity of the (e.g., each) domain. The specificity may be based on how specific a term may be, for example, how specific the term is to a company. The specificity may be pre-defined (e.g., determined prior to a user's interaction with the EDA) in examples, although in examples the specificity may be dynamically determined. For example, the specificity may be determined (e.g., dynamically determined) based on the user, the terms provided by the user, and the like.

Example domains may include function, business, organization, product, etc. domains, although such domains are for illustration purposes only and one or more additional domains may be used in examples. The user may relate to one or more domains, such as the user being related to a function domain, a business domain, an organization domain, a product domain, etc. The specificity of the domain may be in one or more orders. For example, the specificity of the domains (e.g., least specific to most specific) may be in the order of function domain, business domain, organization domain, product domain. In such example the function may be the least specific domain and the product domain may be the most specific domain. It should be understood that the number, identity, etc., of the domains are for illustration purposes only and more (or less) domains may be provided. Also, or alternatively, the domains may be presented in one or more orders that may differ from the examples provided herein.

As described herein, the EDA may receive and/or provide information relating to one or more domains within one or more enterprises. For example, an enterprise may include information relating to sales, customers (e.g., customer relation management (CRM)), technology, inventory, and the like. As the enterprise digital assistant may provide guidance and/or information specific to a particular domain of the enterprise, a natural language processing may be used that provides and/or interprets one or more terms used by a user that is appropriate for the desired domain (e.g., level of domain) of a possible multitude of domains (e.g., domain levels).

FIG. 1 shows a high-level architectural overview of an example enterprise digital assistant (EDA) that may provide information, guidance, and the like relating to one or more domains of an enterprise. The architecture enables a user of a mobile device 102 to provide a query, statement, or the like to access data stored in one or more EDA databases 114a, 114b, ... 114n (collectively 114). In an example a query of the user may be provided in the natural language of the user and may be provided to the mobile device 102 via spoken or written words, such as text typed in a chatbot setting. The data to be provided to the user (in response to the query of the user) by the EDA may be received from one or more remote locations, such as one or more servers in one or more locations and/or one or more databases (such as database 108) in one or more locations. The data provided to the user may be provided in the natural language of the user in a voice and/or text, via mobile device 102. The user may provide information to the EDA and/or receive responses from the EDA in a conversational manner.

Mobile device 102 may provide the query, statement, etc., of the user to query component 104. Query component 104 may receive the terms of the query, for example, and perform one or more operations on the terms of the query. For example, for one or more (each) of the terms of the query, the terms may be saved to the terms database 108. The terms may be saved in text format and/or in spoken format. In examples in which the mobile device 102 provides the terms in spoken format, the spoken terms may be converted to text via voice-and-text formatter 106—and saved in terms database 108. In examples in which the mobile provides the terms in text format, additional conversion of the terms to text may be unnecessary and the text may be saved to the terms database 108. While the previous examples describe the voice-and-text formatter 106 converting spoken terms to text, it should be understood that this is for illustration purposes only and voice-and-text formatter 106 may convert textual terms to spoken word and/or spoken terms to text.

One or more of the terms (e.g., spoken terms and/or textual terms) may be provided to Enterprise Domain System 110. The terms provided to Enterprise Domain System 110 may be pre-processed, as described herein. For example, spoken terms may first be converted to text prior to being provided to Enterprise Domain System 110. Domain information may be used to convert the spoken terms to text. Error correction of the terms and/or domain information may be used during and/or after the conversation of the spoken words to text. For example, information relating to the user and/or domain information may be used to ensure that the converted terms are the terms that were most likely spoken by the user (e.g., intended by the user).

Enterprise Domain System 110 may include one or more servers, such as server 112 and/or one or more databases, such as databases 114. The servers and/or databases may include one or more hardware and/or software components, as described herein. As an example, the servers and/or databases may include one or more motherboards, central processing units (CPUs), and/or graphics processing units (GPUs), a random access memory (RAM), hard drive, power supply, inputs, power supply, and the like. An example CPU may include the Intel 80486 (486) processor.

The one or more servers 112 and/or databases 114 may relate to one or more (e.g., each of the) domains and/or one or more sub-domains of the enterprises. Servers 112 and 114 may be located remotely from Query component 104 and/or mobile 102, in examples. Enterprise Domain System 110 may relate to one or more enterprises. The enterprises (e.g., each of the enterprises) may include (e.g., be associated with) one or more domains that may (e.g., may each) relate to at least one of a function domain, a business domain, an organization domain, a product domain, and the like. In such example, one or more of the servers 112 and/or one or more of the databases 114 may relate (may each relate) to at least one of a function domain, a business domain, an organization domain, a product domain, etc. For example, database 114a may relate to a function domain, database 114b may relate to a business domain, and the like.

A function domain may relate to a function performed for a company. For example, a function may include a sales function, a marking function, a research & development function, a production function, a human resources function, a strategy function, a finance function, a customer service function, and the like. A business domain may include one or more of the businesses in which the company is associated. Example business domains may include a healthcare domain, an insurance domain, a telecommunications domain, a real estate domain, a construction domain, and the like. An organization domain may include the business (e.g., business name) of the company. The organization domain may include the company (only the company), although in examples the organization domain may include the company and one or more companies associated with the company, such as a subsidiary of the company, etc. A product domain may include one or more of products in which a company may have an interest. For example, a product may be sold to a company, sold by a company, produced by a company, and the like. Example product domains may include a lung replacement device, a heart assistance device, a software application, and the like.

As described herein, one or more (each) of the terms of the query and/or statement of the user may relate to one or more of the domains. For example, a term may relate to one or more of a function domain, a business domain, an organization domain, and/or a product domain. As an example, a user may provide a query in a natural language of the user containing the term "GOS" to the mobile device. In the example the user may be referring to galacto-oligo-saccharides. As the spoken word is received by the EDA, GOS may sound like the term ghost, goes, GOS, etc. The mobile device 102 may provide the query, including the term "GOS" to the query component 104. The voice-and-text formatter 106 may convert the spoken term to text. For example, the voice-and-text formatter 106 may convert the term GOS to at least one of "ghost," "GOES," "GOS," etc. Additional processing may be performed on the converted text in an attempt to convert the term to the term spoken (e.g., intended to be spoken) by the user. For example, information related to the user may be used by the voice-and-text formatter 106 to determine the term that was intended to be spoken by the user.

The query component 104 may provide one or more (e.g., all) of the terms to the Enterprise Domain System 110. The Enterprise Domain System 110 may determine domains that are relevant to the user. For example, the Enterprise Domain System 110 may determine which function domain, business domain, organization domain, product domain, etc., that relates to the user. The Enterprise Domain System 110 may determine the domains that are relevant to the user in one or more ways. For example, the user may provide such information when signing up (e.g., registering) to use the services provided by the Enterprise Domain System 110. In another example, the Enterprise Domain System 110 may determine domains relevant to the user based on identification information of the user (e.g., email address) of the user when the user signs in (e.g., is authenticated) by the Enterprise Domain System 110. The Enterprise Domain System 110 may determine the business function domain, business domain, organization domain, and/or product domain in which the user belongs and/or is associated with via information provided in the email address of the user. In examples, the Enterprise Domain System 110 may parse the email address to find such information, although in other examples the Enterprise Domain System 110 may access one or more databases that correspond the user information with the domain related to the user, such as the business function domain, business domain, organization domain, product domain.

The Enterprise Domain System 110 may determine the domain in which the term provided in the user's query is likely related. For example, the Enterprise Domain System 110 may determine that the user is related to the sales function in the healthcare business of company ABC. The Enterprise Domain System 110 may determine that user is related to a lung replacement product, such as selling the lung replacement product. Based on such information, the Enterprise Domain System 110 may determine that the term is likely related to a sales function domain, a healthcare business domain, organization ABC domain, and/or a lung replacement product domain. The Enterprise Domain System 110 may search one or more of the related domains to determine if there is a term similar to the term provided (e.g., spoken, written) by the user.

The domains may include one or more levels (e.g., domain levels). The levels may include the highest degree of a generic domain (e.g., the least specific domain) to the lowest degree of a generic domain (e.g., the most specific domain), or vice-versa. For example, the most generic domain level may be found on the top level of the domain levels and the most specific domain level may be found on the bottom level of the domain levels. In an example, the function domain may be the top level, the business domain may be on a level below the function domain, the organization domain may be on a level below the function domain, and/or the product domain may be on a level below the organization domain, although this is only one example and more (or less) domains may be used that are in one or more different orders, levels, or layers. For example, a generic domain that not relating to any of a function, business, organization, or product may be the most generic domain and may be situated above the function domain.

A weight (e.g., weight value) may be associated with one or more (e.g., each) of the domain levels. The weight values may be based on the domain level. For example, the lowest weight value may be associated with the most generic (e.g., top) domain level and/or the greatest weight value may be associated with the most specific (e.g., bottom) domain level. The values of the weight values of the domain levels may be directly proportional to the specificity of the domain levels. For example, the weight values of the levels may increase from most generic (top level) to most specific (bottom level). In examples one or more of the levels may have the same weight.

As described herein, the Enterprise Domain System 110 may determine one or more domain levels associated with one or more terms. The Enterprise Domain System 110 may determine one or more domain levels associated with a term, for example, based on information provided by the user of the mobile device 102, such as the email address provided by the user. As an example, the user of the mobile device 102 may be associated with an email address of firstNamelastName@ABC.com. In such example Enterprise Domain System 110 may determine the function domain, business domain, organization, and/or product associated with the user based on the email address of the user.

The Enterprise Domain System 110 may search one or more databases, such as one or more databases 114 to determine if the user is associated with a particular domain. Using the example shown on FIG. 1, a first database 114a may be associated with one or more functions, a second database 114b may be associated with one or more businesses, and a third database 114n may be associated with one or more organizations. The Enterprise Domain System 110 may search the first database 114a to determine if the user is associated with one or more functions, may search the second database 114b to determine if the user is associated with one or more businesses, and/or may search the third database 114n to determine if the user is associated with one or more organizations.

Upon searching the first EDA database 114a, the Enterprise Domain System 110 may determine that the user is associated (or is not associated) with a function domain. If the Enterprise Domain System 110 determines that the user is associated with a function domain, the Enterprise Domain System 110 may determine whether the term provided in the user's query and/or statement (e.g., a term substantially similar to the term in the query) is associated with the function domain. For example, as described herein, the user may provide a query with the term GOS. GOS may be an acronym that has many meanings, such as grade of service (for a technology function domain), gross operating surplus (for a production function domain), and generic object service (for a sales function domain). If the Enterprise Domain System 110 determines that the user is associated with a sales function, the Enterprise Domain System 110 may determine that the term matches with the sales function. A corresponding weight for the term generic object service being associated with the sales function domain may be provided. Although the example describes the term being associated with a single function domain, it should be understood that the term may be associated with one or more function domains.

Upon searching the second EDA database 114b, the Enterprise Domain System 110 may determine that the user is associated (or is not associated) with a business domain. If the Enterprise Domain System 110 determines that the user is associated with a business domain, the Enterprise Domain System 110 may determine whether the term provided in the query (or a term substantially similar to the term in the query) is associated with the business domain. Using the above example, the user may provide a query with the term GOS. GOS may be an acronym that has many meanings, such as grade of service (for a networking business domain), gross operating surplus (for an accounting business domain), and galacto-oligosaccharides (for a healthcare, i.e., life sciences) business domain). If the Enterprise Domain System 110 determines that the user is associated with a healthcare business, the Enterprise Domain System 110 may determine that the term matches with the healthcare business. A corresponding weight for the term galacto-oligosaccharides being associated with the healthcare business domain may be provided. Although the example describes the term being associated with a single business domain, it should be understood that the term may be associated with one or more business domains.

Upon searching the third EDA database 114n, the Enterprise Domain System 110 may determine that the user is associated with (or is not associated with) an organization domain. If the Enterprise Domain System 110 determines that the user is associated with an organization domain, the Enterprise Domain System 110 may determine whether the term provided in the query (or a term substantially similar to the term in the query) is associated with the organization domain. Using the above example, the user may provide a query with the term GOS. GOS may be an acronym that has many meanings, such as grade of service (associated with LMN corporation), gross operating surplus (associated with XYZ corporation), and galacto-oligosaccharides (associated with ABC corporation). The Enterprise Domain System 110 may determine that the user is associated with ABC corporation. A corresponding weight for the term galacto-oligosaccharides being associated with the ABC organization domain may be provided. Alternatively, if the user is associated with the NEX company, a corresponding weight may not be associated with any term as there is no association with the NEX company and a term that is GOS or similar to GOS. Although the example describes the term being associated with a single organization domain, it should be understood that the term may be associated with one or more organization domains.

Also, or alternatively, the term may be associated with one or more other domains, such as a generic domain (e.g., a domain that is none of a function domain, business domain, or organization), a product domain, etc. Using the above example, the term "GOS" may be received by the Enterprise Domain System 110. The Enterprise Domain System 110 may search a generic database to determine whether the term is found in the database. In such an example, the Enterprise Domain System 110 may determine that the term "ghost" is associated with the generic domain. A corresponding weight for the term ghost being associated with the generic domain may be provided. Although the example describes the term being associated with a single generic domain, it should be understood that the term may be associated with one or more generic domains.

The Enterprise Domain System 110 may determine the domain level associated with the term in which the greatest weight is associated (e.g., assigned). As described herein, the domain level may be associated with a specificity (e.g., a pre-determined specificity). The specificity of the domain level may determine the weight value attributed to the domain level. For example, the term GOS may be provided to the Enterprise Domain System 110. Based on the term GOS, the term ghost may be associated with the generic domain and the term GOS may be associated with the organization domain. As the organization domain is more specific than the generic domain, the Enterprise Domain System 110 may determine that the term GOS has a higher weight value than the term ghost. As a result, the Enterprise Domain System 110 may determine that the term GOS (and not the term ghost) was likely intended by the user to be provided to the mobile device.

The term GOS may be stored in memory and/or returned to the user. In an example one or more terms may not be stored under one or more predefined conditions. For example, the term may not be saved if the term is deemed irrelevant, may present personal privacy concerns, may present regulatory concerns, etc. For example, the term may not be saved (e.g., may be scrubbed) if the term relates to a health condition of a patient that may present privacy concerns, relates to regulated information related to a drug, etc. The EDA may scrub (e.g., not save) such information in real-time during the saving of one or more other terms. The information may be scrubbed automatically using machine learning techniques. In other examples the information may be scrubbed (e.g., scrubbed manually) by the user.

While a single term (e.g., GOS) is used herein, such term is for illustration purposes. One or more terms of one or more queries may be processed in a similar manner to determine the term provided by the user to the mobile device. The one or more terms may be presented to the user in a natural language of the user. Although function, business, organization, and product domains are described herein, it should be understood that more or fewer domains may be provided in examples.

FIGS. 2A-2D show example graphical user interfaces (GUIs) in which the user is providing queries to the EDA system and receiving feedback, as described herein. As can be seen on FIGS. 2A-2D, the GUIs relate to information pertaining to a customer Mark Daniels, MD. Such examples are for illustration purposes, as example GUI interactions may relate to one or more persons, companies, topics, queries, recommendations, and the like.

Figure 2A:
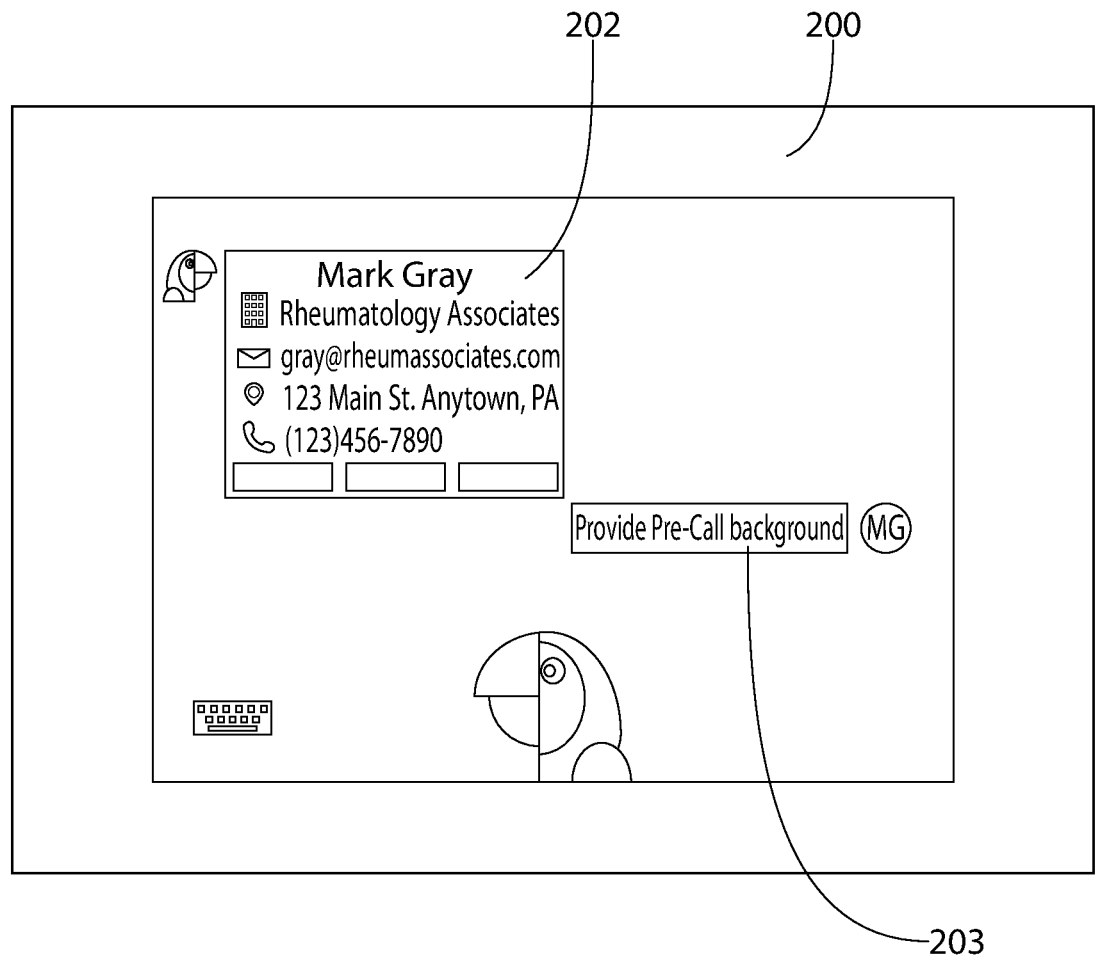
FIGS. 2A-2D show example interactions of a user and graphical user interfaces (GUIs) of the EDA.

FIG. 2A shows an example GUI 200 in which the user is requesting information from the EDA. The information requested may be pre-call background information 203 for a client (e.g., customer) Mark Gray, MD. As can be seen, the user may select a client, for example, via client box 202. Client box may include the contact information of the client, such as the name of the client, address of the client, telephone number of the client, etc. Information of client box 202 may be previously configured (e.g., previously input by the user or another) in examples, although in other examples the user may provide the contact information when requesting additional information relating to the client. Upon selecting a user, commands and/or query selections may be provided for the user to select. Such commands and/or queries may include "Pre-call," "Navigate," and "Phone," although examples may include more (or less) commands and/or queries relating to client.

Figure 2B:
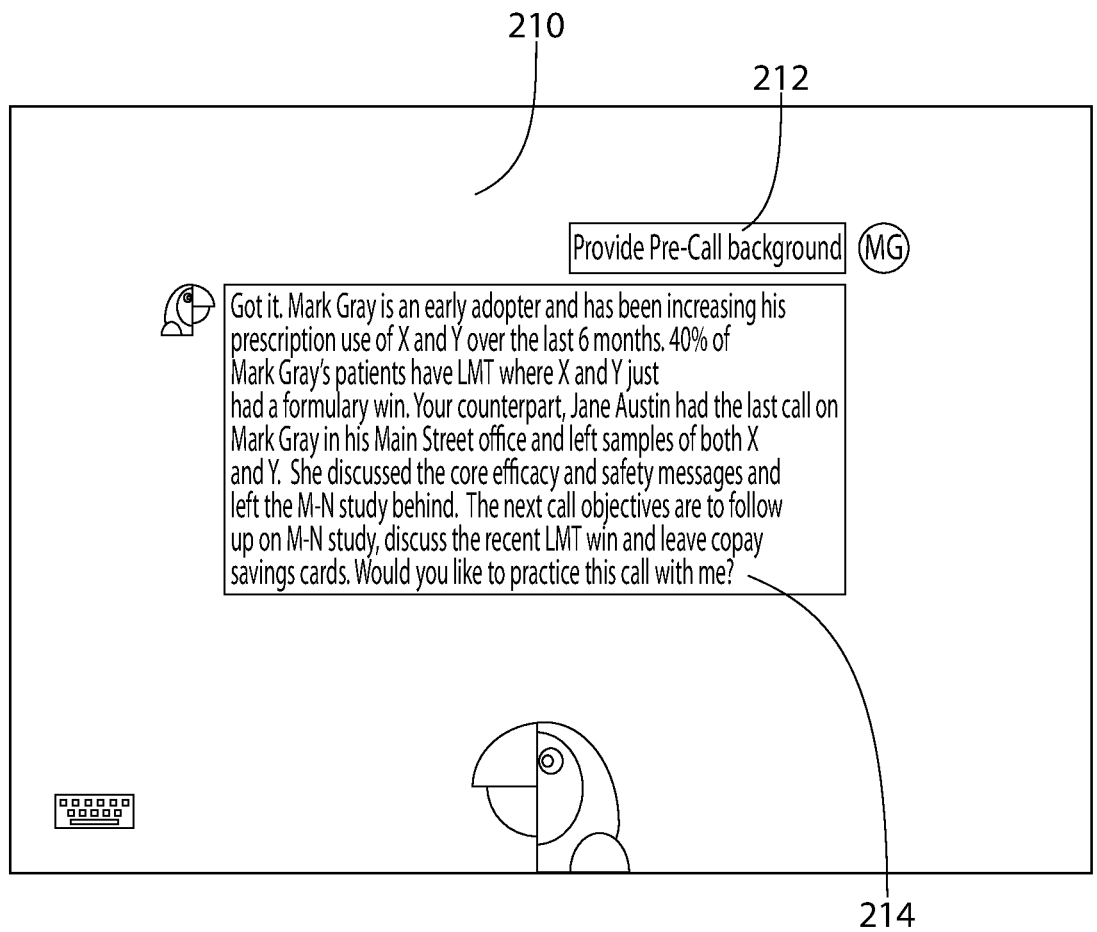
Figure 2C:
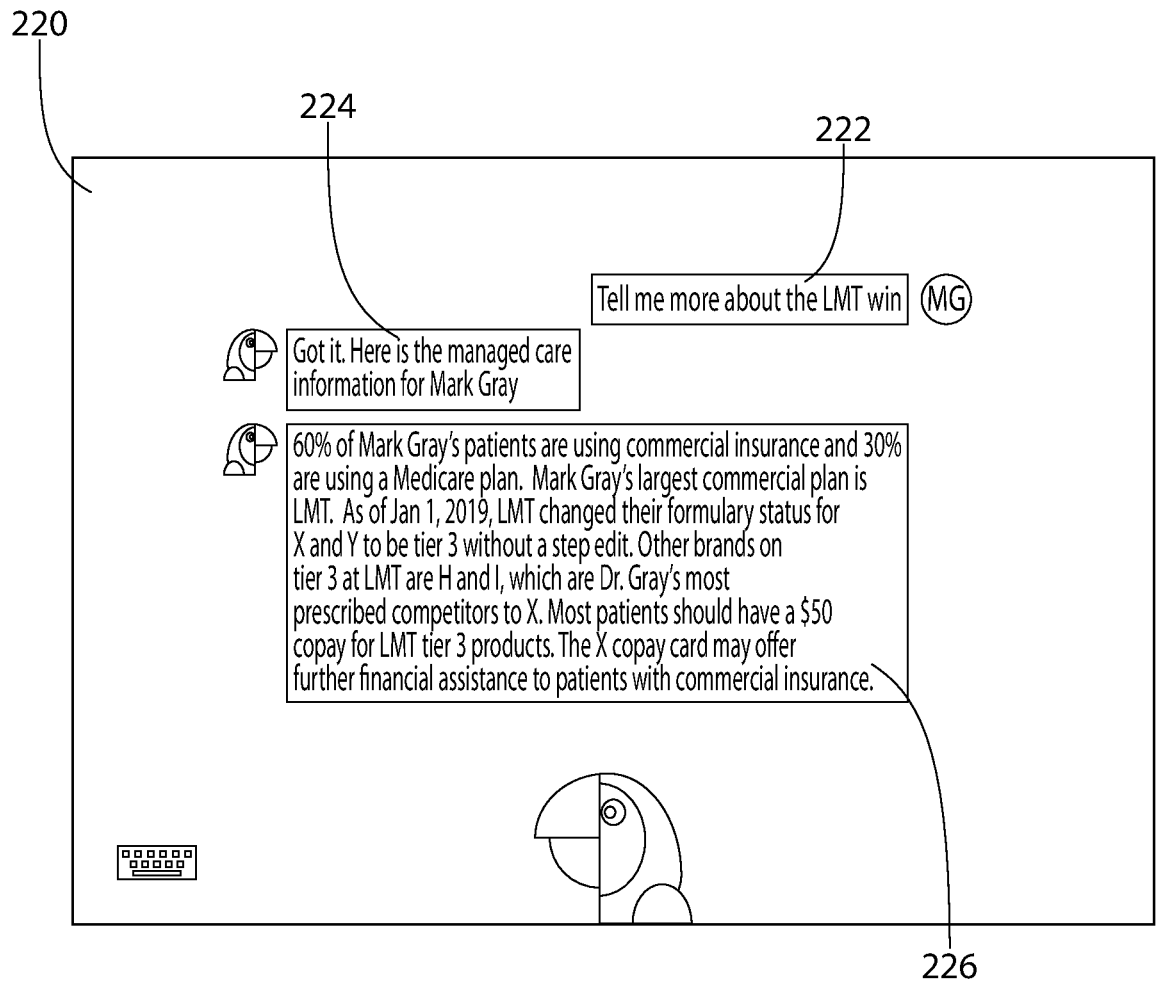

FIG. 2B shows the GUI 210 provided in response of the user selecting the command and/or query of Pre-Call, as shown on FIG. 2A. Command and/or query 212 of user may be provided. As shown on FIG. 2B, the information 214 provided in response to the command and/or query is in the natural language of the user. The information provided to the user may be retrieved from one or more databases, such as EDA database 114. The information may be provided to the user in the natural language of the user. The information may be provided via text, voice, or a combination of voice and text. The GUI may provide additional information to the user based on a user request of the additional information. For example, the user may request information in addition to the information 214 shown on GUI 210. Such information may relate to previous commands and/or queries or may be unrelated to the previous commands and/or queries provided by the user. Upon the user requesting the additional information, the GUI may provide such information.

Figure 2D:
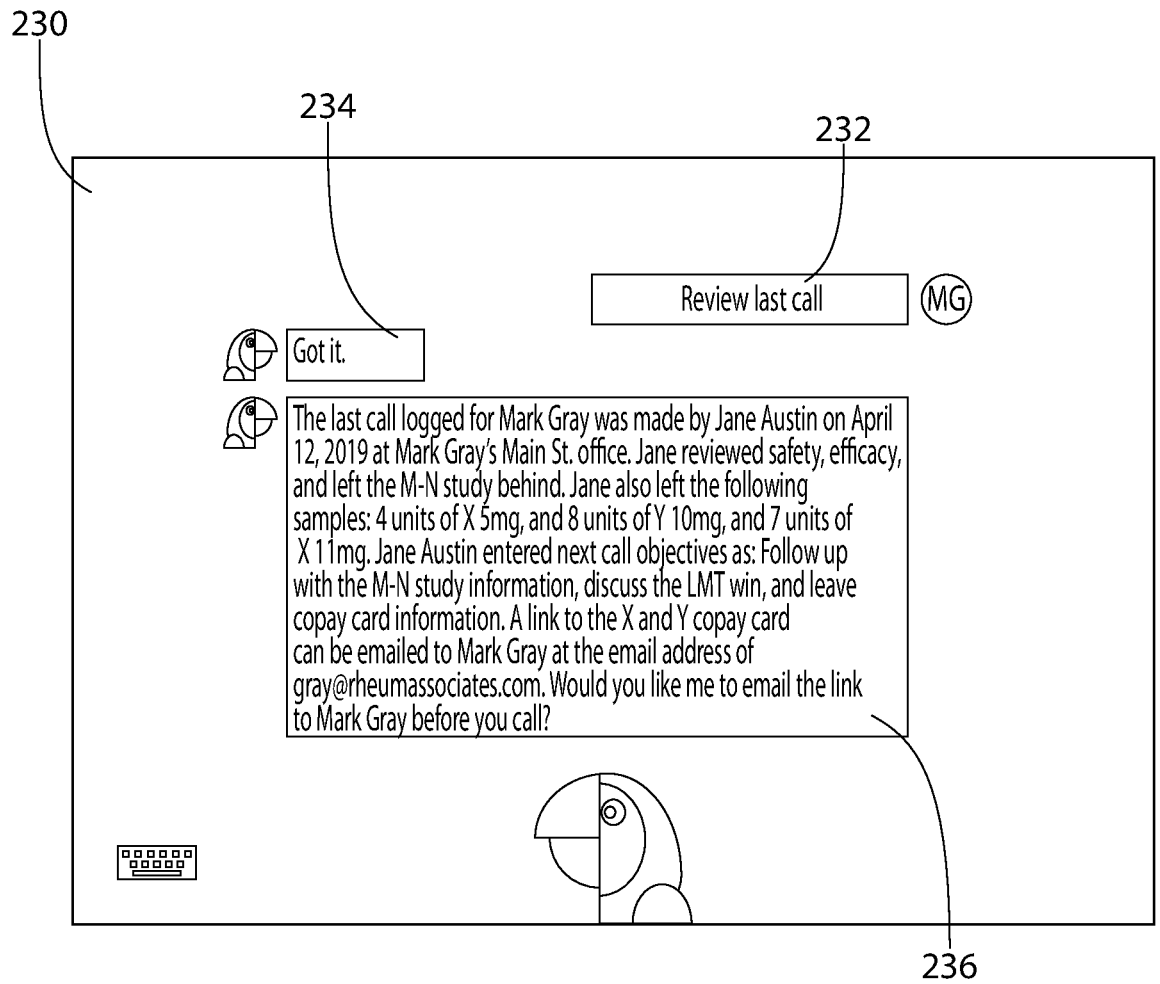

The GUI may perform one or more additional features, such as requesting material about a topic (as shown on FIG. 2C) and/or reviewing a previous call (as shown on FIG. 2D). As shown on FIG. 2C, the user may request 222 additional information about win of a company (e.g., company LMT). The GUI 220 may provide the additional information, such as a summary 224 of what is to be provided in response to the request and/or information 226 relating to Mark Gray and the request. As shown on FIG. 2D, last call (e.g., last call of the user) may be reviewed. The user may request 232 that the last call be reviewed. The GUI 230 may provide an acknowledgement 234, that may service a function of notifying the user that the system is performing the action. The acknowledgement 234 may be used to provide a conversational flow of the interaction with the user. Previous call information 236 may be provided. The previous call information 236 may include (e.g., may only include) information deemed relevant, information in which the user has proper access, information that does not impinge privacy and/or regulatory concerns, etc. For example, the previous call information 236 may be scrubbed of information that may relate to a regulatory concern and/or patient client privacy concerns. The EDA may scrub (e.g., remove) such information in real-time during the saving of the previous call in some examples. The information may be scrubbed automatically using machine learning techniques. In other examples the information may be scrubbed (e.g., scrubbed manually) by one or more stakeholders (such as the previous caller, the user, a supervisor, a privacy expert, etc.).

The conversation between the user and the system may continue until the user receives the information desired from the system. The conversation may terminate upon the user indicating to the system that the call should be terminated (e.g., by speaking a command to end the conversation), or the system may terminate the conversation upon a time in which no activity has occurred from the user. A transcript of one or more conversations between the user and the system may be recorded and/or sent to one or more stakeholders, such as the user, the supervisor of the user, etc.

Figure 3:
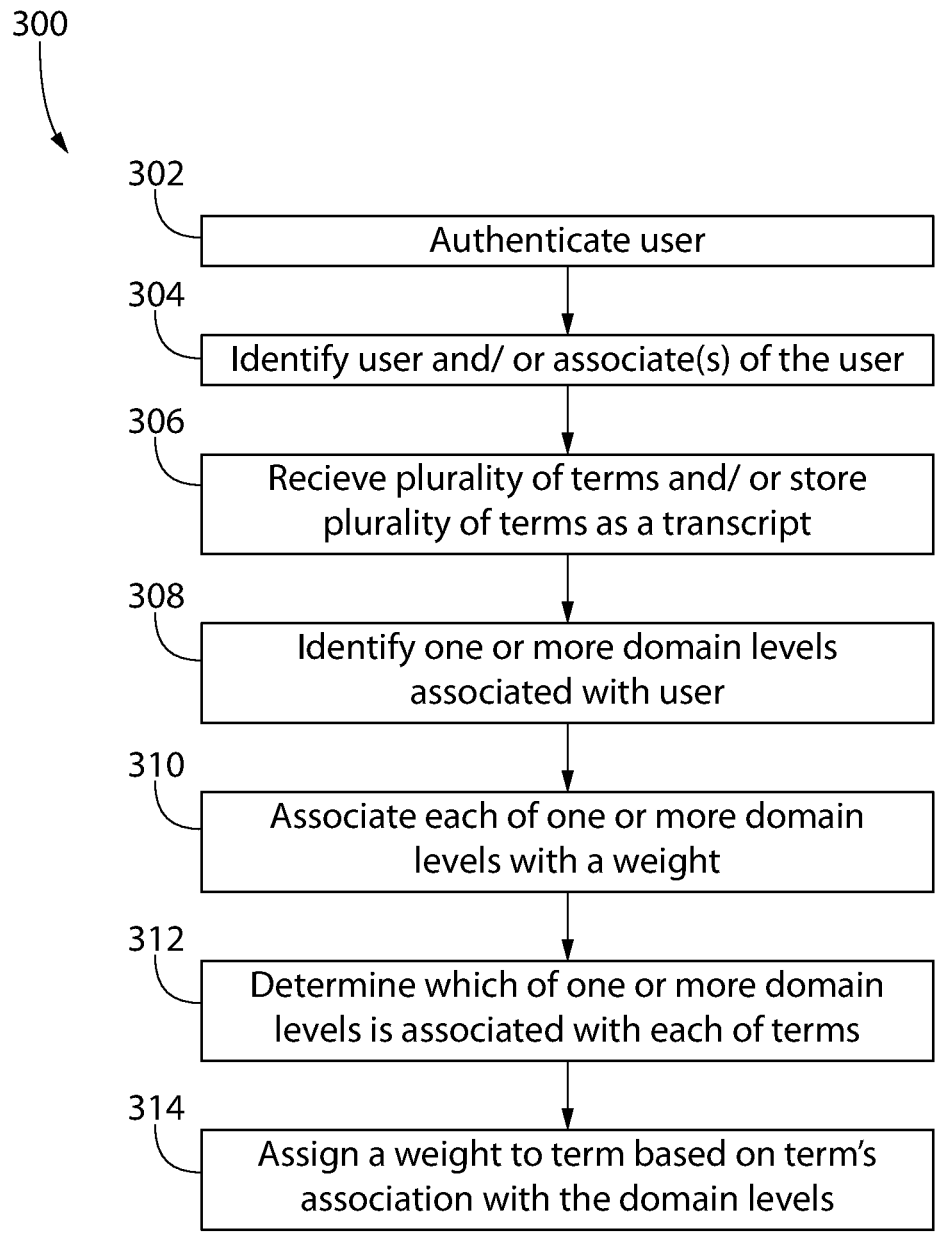
FIG. 3 shows an example process in which natural language processing (NLP) is performed for an enterprise of domains.

FIG. 3 shows an example process 300 in which natural language processing is performed for an enterprise of domains, as described herein. At 302, the user is authenticated. The user may be authenticated using a unique identification of the user (e.g., an email address of the user, a user name/password of the user, etc.). At 304, a user may be identified via an identification (e.g., unique identification) of the user and/or via one or more people or entities associated with the user. The unique identification may include a component identifying the user. For example, the user may be identified as being a part of a company and/or organization. As described herein, the identification may be based on a domain of an email address or other information provided by the user (e.g., via a drop down menu). The user information (e.g., identification information) may be stored.

At 306, a plurality of terms may be received from the user. The plurality of terms may be spoken words, text, or a combination of spoken words and text. The terms may be provided in the natural language of the user. If the terms received are spoken words, the terms may be converted to text via a speech to text processing. The speech to text processing may be based on machine learning techniques, such as supervised machine learning techniques, unsupervised learning techniques, and the like. Example supervised machine learning techniques may include linear regression, logistic regression, naive Bayes, linear discriminant analysis, decision trees, k-nearest neighbor algorithm, Neural Networks (Multilayer perceptron), and the like. Unsupervised machine learning techniques may include clustering (hierarchical clustering, k-means, mixture models, etc.), Anomaly detection, and/or neural network techniques. The converted text may be saved in memory. In examples, a score (e.g., confidence score) may be associated with the converted text. The confidence score may be saved.

At 308, one or more domain levels (e.g., domains of an enterprise and/or domain levels of an enterprise) may be identified. The one or more domain levels (e.g., domain layers) may be associated with the user and/or an entity related to the user. Each domain level may have a bias adjustable for the organization. The bias (e.g., adjustable bias) may be used as a weight for the confidence score of the transcript produced by the level. One or more (e.g., each) domain level may have a machine learning model trained with speech recordings. The speech recordings may be function domain specific (e.g., sales, marketing), business domain specific (e.g., healthcare, real estate, construction), and/or organization domain specific. One or more of the domain specific transcription models may be transcribed. The transcription and/or the confidence score may be saved. The score (e.g., confidence score) may be compared across common transcription layers, organization transcription layers, etc. The transcript with the highest confidence score weighted with the bias factor (e.g., defined for each domain layer by organization) may be selected. The transcript may be provided to the intent processing component, for example, for determining of the intent of the user.

At 310, the one or more domain levels (e.g., each of the one or more domain levels) may be associated with the weight (e.g., weight value). For example, one or more intent processing layer domains may be retrieved. The one or more intent processing layer domains may be associated with a function domain, a business domain, an organization domain, a product domain, etc. Each domain level may have a bias factor adjustable (such as adjustable for an organization). The bias factor may be used as a weight value, as described herein. The weight value may be used for a confidence score (e.g., the confidence score of the intent produced by and/or associated with a domain level).

One or more (e.g., each) domain level may have a machine learning model, such as a supervised or unsupervised machine learning model, that may be trained with training data. The training data may be specific to a domain, such as a function domain (e.g., sales, marketing, etc.), a business domain (e.g., healthcare, life sciences, real estate, construction, etc.), an organization domain, a product domain, and the like.

At 312, it may be determined which of the one or more domain levels is associated with one or more (e.g., each) of the plurality of terms and, at 314, a weight value may be assigned to the term. The weight value may be assigned to the term based on the term's association with one or more of the domain levels. The intended term (e.g., the domain specific term that the user most likely intended to provide to the EDA) may be determined. The domain specific term may be determined based on the weight values of one or more (e.g., all) of the domain layers associated with the term. For example, the domain specific term may be determined based on the term being associated with the most specific domain layer, which may have the greatest weight. A confidence score may be determined. The confidence score may be based on the weight values across one or more (e.g., all) domains.

A domain level (e.g., domain layer) not associated with a term may receive a zero weight. In other examples a domain level not associated with a domain level (or having a questionable association with a domain level) may have a weight value that may negatively impact the domain level's association with the term. For example, a negative weight value may be used to negatively impact the domain level's association with the term. The intent (e.g., the domain specific term that the user most likely intended to provide) having the highest confidence score (e.g., weighted with the bias factor defined for each domain layer) may be determined. As described herein, the product domain may provide a greater weight value than the organization domain, the organization domain may provide a greater weight value than the business domain, the business domain may provide a greater weight value than the function domain, and/or the function domain may have a great weight value than the generic domain.

Figure 4:
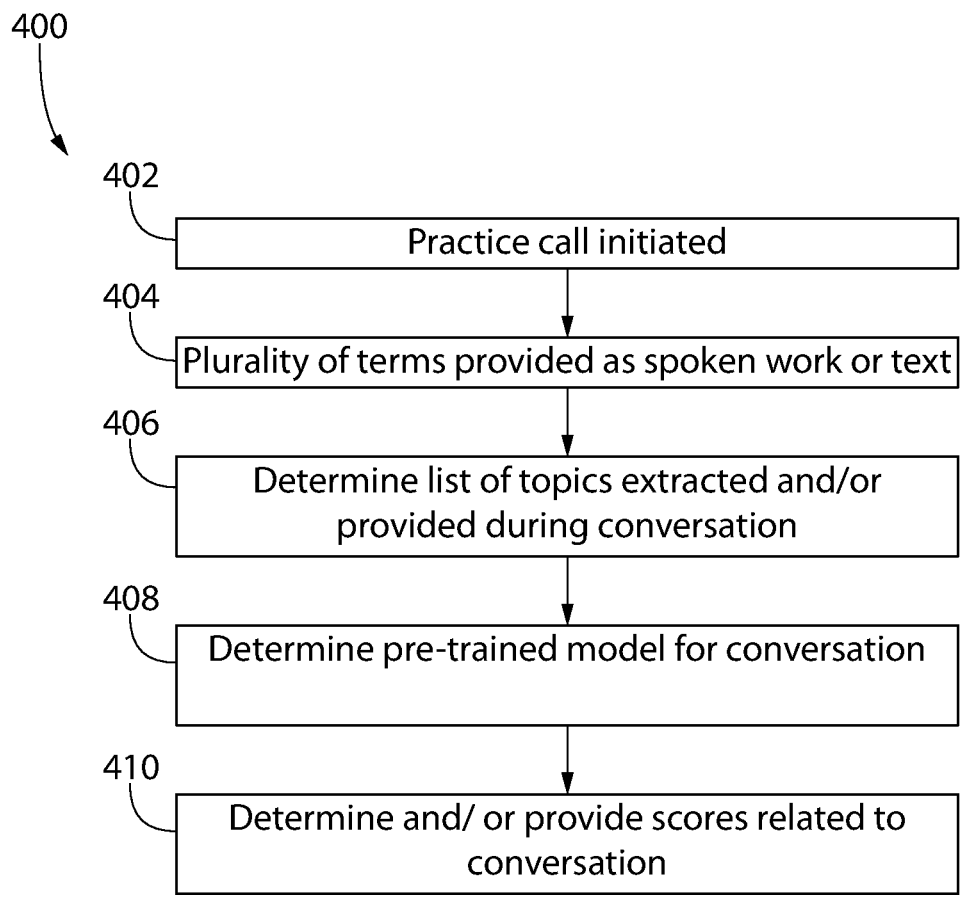
FIG. 4 shows an example process in which the EDA allows a user to practice a conversation.

The enterprise digital assistant (EDA) may provide one or more services that may be useful for enhancing the productivity, efficiency, effectiveness, accuracy, and the like, of the user. For example, the EDA may allow a user to practice a call (e.g., a sales call) with a client. FIG. 4 shows an example process 400 in which the EDA allows a user to practice a call. At 402, the user may initiate a practice call with the EDA (e.g., a GUI of the EDA). The practice call may be associated with a product or another subject in which a user may desire to discuss with a client. The user may initiate the call by providing the user's information, such as the user's identification (e.g., name) and/or contact information (such as email address and/or telephone number). Based on the user's information, the EDA may determine the function of the user (such as a sales function), a business in which the user practices (such as practicing in the life sciences field), an organization in which the user is associated, and/or products in which the user is affiliated (e.g., a product in which the user is responsible for selling). In examples the user information may determine the access to be granted to the user (such as client information, employee information, survey information), the extent of services to be provided to the user (such as basic or premium services), and the like.

At 404, the user may provide a plurality of terms. The terms may be provided via spoken words, text (such as via a chatbox or transcript), and the like. Based on the plurality of terms provided by the user, a conversation (e.g., simulated conversation) may be conducted between the user and the EDA. The EDA may provide and/or receive information that may be expected to be provided and/or received by a client during a conversation with the user. The topic of the conversation, the information transferred during the conversation, etc., may be based on user information and/or domains related to the user. For example, the EDA may determine that the user is a sales person in the life sciences business area that sells product X. In such example the EDA may have a conversation with the user that is based on such information.

At 406, a list of topics to be extracted and/or provided during the conversation may be determined. The topics to be provided may be one or more statements in response to the query and/or statement of the user. The topics may relate to the domain in which the user is related, such as the organization of the user, the product associated with the user, or one or more other areas of interest associated with the user. The EDA may perform one or more (e.g., a series of) steps (e.g., pre-processing steps) to improve the quality of the terms (e.g., terms provided via voice or text). The quality of the text may be improved such that known issues with the voice transcription may be eliminated. For example, the text may be improved via one or more substitutions using approximate string matching (e.g., fuzzy string searching), neural network and machine learning algorithms, and/or phonetic algorithms optimized by each topic.

At 408, the EDA may determine and/or provide a pre-trained machine learning model. The pre-trained machine learning model may be fine-tuned for the topics to be extracted, for example, the topics to be extracted for the particular user. One or more (e.g., a series) of queries may be provided by the EDA. The queries may be based on the pre-trained model to identify if a topic is present is the text submitted (e.g., submitted by the user). A score (e.g., quantitative score) may be determined. The score may be determined based on the topics found and/or provided by the EDA, the terms (e.g., query and/or statement) provided by the user, and the like. The score may be based on a predefined weight, such as a predefined weight for each topic. A score (e.g., qualitative score) may be based on delivery quality factors. Delivery quality factors may include focus, objection handling, addressing need, highlighting value, and the like.

At 410, a score (e.g., score card) may be provided. The score card may include the total score assessed for the practice call, scores for each of one or more topics discussed during the practice call, how the score(s) from the current practice call compare with score(s) from previous practice calls (including whether the current conversation scored higher or lower than prior conversations), and the like. The score may be provided to one or more stakeholders besides the user, such as the supervisor of the user. Feedback may be provided by the EDA, by the supervisor of the user, and/or by the user. For example, the user may provide feedback on topics not found by the system that were present in the text (e.g., text submitted by the user). The supervisor may provide feedback on the quality scores assigned by the EDA. The score provided by the supervisor may be based on one or more of the quality factors. The EDA may be updated (e.g., automatically updated) to include the feedback provided by the user. Also, or alternatively, the EDA may provide feedback to the user, for example, indicating how the user can improve in future conversations.

Figure 5:
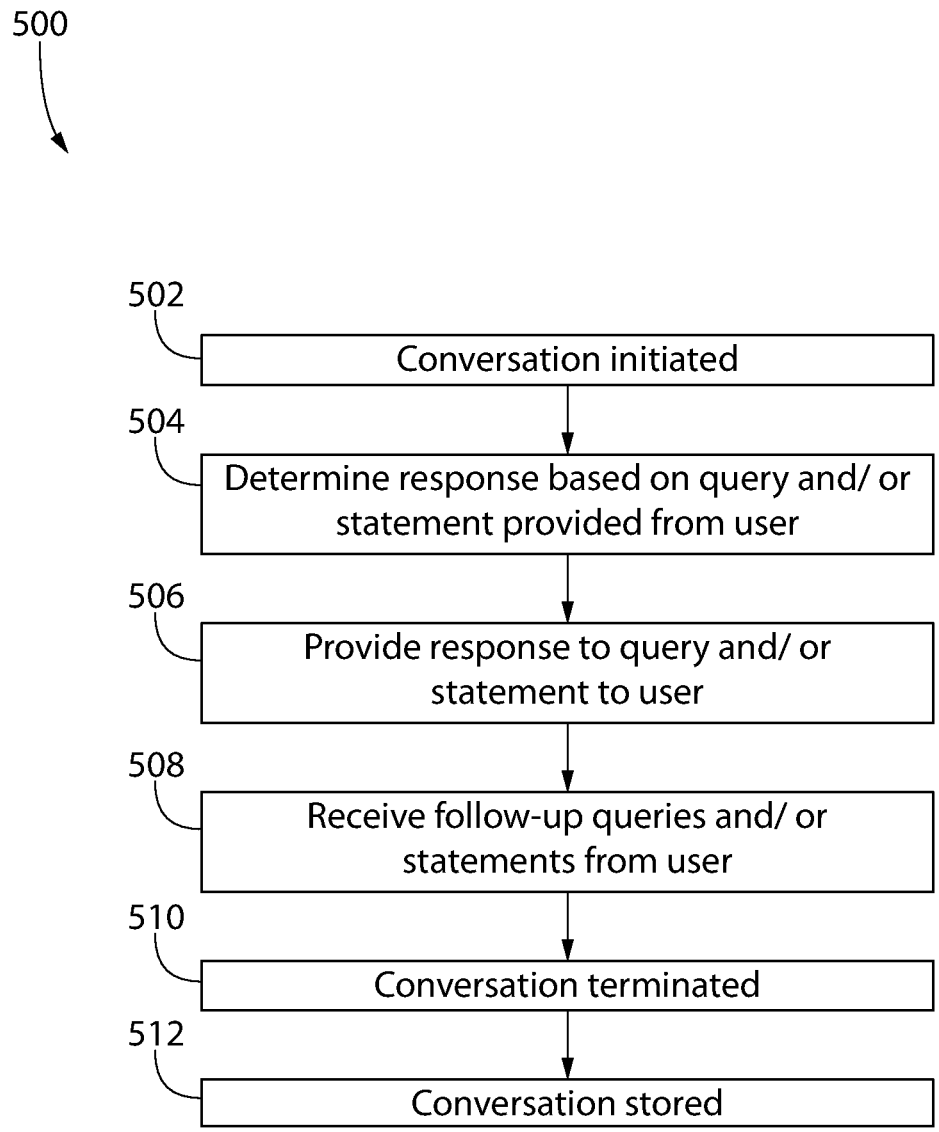
FIG. 5 shows an example process in which the EDA performs optimization of a user's conversation.

The EDA may perform optimization of a user's call. FIG. 5 shows an example process 500 in which the EDA performs optimization of a call. At 502, the user initiates a conversation with the EDA, such as via the GUI of a mobile device. The conversation initiated by the user may be in the form of a query, a statement, and the like. The conversation may be provided to the EDA as a voice of the user, text provided by the user, a selection (such as selection of a drop down menu), and the like.

At 504, the EDA determines (e.g., produces, synthesizes) a response to the user based on the conversation initiated by the user. The response may be a partial response, for example, to a query. In other examples the response may be a complete response. The response provided may be based on one or more templates, statements, business rules, etc., within the EDA.

In examples in which the response is a partial response, the EDA may determine whether additions and/or updates to the response may be provided. The additions and/or responses may be based on one or more data insights. In an example a data insight may be provided by analyzing data provided to the EDA to determine a response for the particular query, statement, etc., provided by the user. The data insight may use information relating to the user, information relating to domains associated with the user, surveys, etc. The EDA may produce and/or provide the updated response. The response may be produced via machine learning techniques. The machine learning techniques may use data insights to process data produced and/or provided to the user.

Additions and/or updates may be based on previous conversations. The user may have been associated (e.g., participated) in the previous conversations, although in examples the previous conversations may have been conducted by those other than user. The flow of the conversation may be modeled based on the previous conversations. For example, the EDA may predict queries from the user and/or answers to the user based on previous conversations with the user or others. The EDA may produce and/or provide the updated response. The response may be produced via machine learning techniques. The machine learning techniques may use the past conversations to process data produced and/or provided to the user.

At 506, the EDA may provide (e.g., present) the response to the user. The response may be presented to the user in the natural language of the user. The response may be in a voice format and/or a text format. The response may be conversational. The response may include a request to whether the response has adequately answered the question.

At 508, the EDA may receive one or more follow up queries and/or statements from the user. The follow up queries and/or statements may be received via voice, text, or a combination of the two. At 510, the conversation between the user and the EDA may terminate. The user may indicate when the user is finished with the conversation. For example, the user may explicitly indicate that the conversation is finished. In other examples the EDA may determine that the conversation is finished, for example, via a passing of a predetermined time in which the user has provided no action to the GUI of the EDA.

At 512, the EDA may record the conversation during the conversation and/or at the conclusion of the conversation. A transcript of the conversation may be sent to one or more parties, such as the user, the supervisor of the user, a colleague of the user, etc. The EDA may update one or more models (e.g., machine learning models) based on the conversation. The updated model may be used to generate future responses based on the conversational conducted between the user and the EDA.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A non-transitory computer-readable medium comprising instructions for a computer program, the instructions operable to:
   receive a plurality of terms in a natural language of a user, wherein the plurality of terms relates to at least one domain of an enterprise of domains;
   store, in a memory, the plurality of terms as text;
   for a term of the plurality of terms, determine one or more domain levels with which the term is associated, wherein each of the domain levels are associated with a pre-determined specificity;
   from the domain levels, identify a most specific domain level having a highest degree of specificity;
   associate the term with a domain-specific term corresponding with the term at the most specific domain level; and
   store, in the memory, the domain-specific term corresponding with the term at the most specific domain level,
      wherein the term is determined to be associated with the one or more levels of a domain layer based on an identification of the user, the identification of the user being at least one of: a name of the user, an email address of the user, or a telephone number of the user.

2. The medium of claim 1 wherein the instructions are further operable to:
   assign a weight value for each of the one or more domain levels in which the term is associated, wherein the weight value is based on the specificity associated with each of the one or more domain levels.

3. The medium of claim 2 wherein the weight value is directly proportional to a degree of specificity associated with the one or more domain levels.

4. The medium of claim 1 wherein the at least one domain is specific to at least one of a function domain, a business domain, an organization domain, or a product domain.

5. The medium of claim 4 wherein the product domain is associated with a higher degree of specificity than the organization domain, the organization domain is associated with a higher degree of specificity than the business domain, and the business domain is associated with a higher degree of specificity than the function domain.

6. The medium of claim 4 wherein the function domain comprises at least one of a sales function or a marking function.

7. The medium of claim 4 wherein the business domain comprises at least one of a healthcare domain, an insurance domain, a telecommunications domain, a real estate domain, or a construction domain.

8. The medium of claim 1 wherein the plurality of terms are received via a graphical user interface of a mobile device, the graphical user interface being at least one of a microphone or a keypad of the mobile device.

9. The medium of claim 8 wherein the graphical user interface receives the plurality of terms in a spoken natural language of the user and the plurality of terms in the spoken natural language of the user is converted to the text.

10. The medium of claim 2 wherein the weight value is modified using supervised machine learning algorithms or unsupervised machine learning algorithms.

11. The medium of claim 8 further comprising providing, via the graphical user interface, the domain specific term for each of the plurality of terms in the natural language of the user.

12. The medium of claim 1 wherein the one or more domain levels in which the term is associated is determined for each term of the plurality of terms.

13. The medium of claim 1 wherein the domain-specific term is provided to the user.

14. A computer-implemented method comprising:
   receiving a plurality of terms in a natural language of a user, wherein the plurality of terms relates to at least one domain of an enterprise of domains;
   storing, in a memory, the plurality of terms as text;
   for a term of the plurality of terms, determining one or more domain levels with which the term is associated, wherein each of the domain levels are associated with a pre-determined specificity;
   from the domain levels, identifying a most specific domain level having a highest degree of specificity;
   associating the term with a domain-specific term corresponding with the term at the most specific domain level; and
   storing, in the memory, the domain-specific term corresponding with the most specific domain level,
      wherein the term is determined to be associated with the one or more levels of a domain layer based on an identification of the user, the identification of the user being at least one of a name of the user, an email address of the user, or a telephone number of the user.

15. The method of claim 14 further comprising assigning a weight value for each of the one or more domain levels in which the term is associated, wherein the weight value is based on the specificity associated with each of the one or more domain levels.

16. The method of claim 15 wherein the weight value is directly proportional to a degree of specificity associated with the one or more domain levels.

17. The method of claim 14 wherein the at least one domain is specific to at least one of a function domain, a business domain, an organization domain, or a product domain.

18. The method of claim 17 wherein the product domain is associated with a higher degree of specificity than the organization domain, the organization domain is associated with a higher degree of specificity than the business domain, and the business domain is associated with a higher degree of specificity than the function domain.

19. The method of claim 14 further comprising providing the domain-specific term to the user.

\* \* \* \* \*